United States Patent [19]

Matsui et al.

[11] Patent Number: 5,121,537
[45] Date of Patent: Jun. 16, 1992

[54] METHOD OF PRODUCTION OF ANCHOR-BONDED COMPOSITE STRUCTURES

[75] Inventors: Shigetomo Matsui, Higashiosaka; Toshio Atsuta, Akashi; Takeshi Yamada, Kobe; Yasuhiro Kumon, Kobe; Makoto Ryoji, Kobe; Toshihiko Ishizuka, Ashiya; Hiroatsu Asari; Shigemi Murakami, both of Kobe, all of Japan

[73] Assignee: Kawasaki Jukogyo Kabushiki Kaisha, Kobe, Japan

[21] Appl. No.: 622,340

[22] Filed: Nov. 29, 1990

Related U.S. Application Data

[63] Continuation of Ser. No. 378,619, Jul. 12, 1989, abandoned, which is a continuation-in-part of Ser. No. 213,286, Jun. 28, 1988.

[30] Foreign Application Priority Data

| Jul. 1, 1987 | [JP] | Japan | 164848 |
| Jul. 1, 1987 | [JP] | Japan | 164849 |
| Jul. 1, 1987 | [JP] | Japan | 164850 |
| Jul. 1, 1987 | [JP] | Japan | 164851 |
| Jul. 1, 1987 | [JP] | Japan | 164852 |
| Jul. 13, 1988 | [JP] | Japan | 172645 |

[51] Int. Cl.$^5$ .............................. B21D 39/00
[52] U.S. Cl. ............................. 29/522.1; 29/514; 29/521; 29/524.1; 29/525.2
[58] Field of Search ............... 29/522.1, 524.1, 525.1, 525.2

[56] References Cited

U.S. PATENT DOCUMENTS

| 264,502 | 8/1882 | Woolson | 29/525.2 |
| 624,927 | 5/1899 | Gurrell | 29/522.1 |
| 1,367,134 | 2/1921 | Hachman | 29/525.1 |
| 2,753,624 | 4/1956 | Taylor | 29/525.2 |
| 3,341,932 | 9/1967 | Haller | 29/521 X |
| 3,526,032 | 9/1970 | Pipher | 29/525.1 |
| 4,048,708 | 9/1977 | Briles | 29/524.1 |
| 4,176,446 | 12/1979 | Quéré et al. | 29/522.1 X |
| 4,249,298 | 2/1981 | Kanamaru et al. | 29/522.1 X |

Primary Examiner—P. W. Echols
Assistant Examiner—David P. Bryant
Attorney, Agent, or Firm—Wenderoth, Lind & Ponack

[57] ABSTRACT

A method of producing an anchor bonded composite plate. Anchor cavities are formed in a base plate by placing a forming plate with a circular hole therethrough over the base plate at a selected anchor cavity location. A punch placed through the circular hole then applies a punching force to the base plate, thereby forming in the base plate an annular mound with a concentrically punched hole. The mound is next pressed with a leveling plate to cause the material of the mound to flow inside the punched hole forming an anchor cavity with an overhanging internally tapered surface. A cladding plate with a plurality of anchor holes is then placed on the base plate with its holes aligned with the cavities of the base plate. An anchor pin is inserted in the thus aligned openings and is plastically deformed to mechanically bond the plates together. The cladding plate and the base plate may be made of an aluminum alloy and a hard steel, respectively. The composite plate thus produced is applicable as a reaction plate for a linear motor vehicle and as a tank material for a liquid natural gas holder.

3 Claims, 7 Drawing Sheets

FIG. 50 and the cladding plate to a substrate or base plate to obtain an
METHOD OF PRODUCTION OF ANCHOR-BONDED COMPOSITE STRUCTURES This application is a continuation of now abandoned application, Ser. No. 07/378,619, filed Jul. 12, 1989, which is a continuation-in-part of application Ser. No. 07/213,286, filed Jun. 28, 1988.

BACKGROUND OF THE INVENTION

This invention relates generally to the production of composite structures each produced by joining two or more separate materials to form a single unitary structure. More particularly the invention concerns the fabrication of composite structures by strongly joining a cladding plate to a substrate or base plate to obtain an integral structure. An example of such a cladding plate is made of aluminum or an alloy thereof. An example of the material for the base plate is steel. Examples of products which can be advantageously made of such composite structures are plate materials for tanks of liquid natural gas transport ships and reaction plates for linear motor vehicles.

More specifically, the invention relates to the production of anchor bonded composite structures each comprising a hard substrate or base plate made of a material such as steel and a relatively soft cladding plate made of a material such as an aluminum alloy and having a plurality of anchor parts which are forced under great pressing force into corresponding anchor cavities in the base plate, whereby the two plates are joined firmly to form a unitary structure.

An important feature of the invention is that, at the deepest portion of each anchor cavity in the base plate, one or more overhanging parts are formed, whereby, when the corresponding anchor part of the cladding is forced under great pressing force into this anchor cavity, the anchor part undergoes plastic deformation to assume a sectional shape of the letter T or Y in inverted from which completely fills the anchor cavity. Thus a positively locking joint or anchor bond is produced. A plural number of the anchor bonds of join the two plates as an integral structure.

A review of some aspects of the pertinent prior art may be instructive for an understanding of the present invention. As is known, laminated metal structures are becoming widely used as materials in various machines, devices, and structures. Examples, as mentioned hereinbefore, are reaction plates for linear motor cars and tank materials of liquid natural gas transport vessels All required characteristics such as mechanical strength, corrosion resistance, behavior relative to heat, and elongation/contraction properties cannot be completely satisfied by a plate material of a single substance. Accordingly it is becoming a widely spreading practice to use plate materials produced by firmly joining base plates of hard steel and cladding plates of soft aluminum alloy to obtain an integral plate structure.

However, composite plate structures of the character described above have. heretofore been produced by methods such as explosion pressure bonding. The use of such methods is inconveniently limited by the dimensions of the product such as thickness. Furthermore, these methods require substantial labor, whereby production costs tend to rise.

Still another problem has been slippage at the interface between the two plates due to severe conditions of use such as vibration over a long period.

SUMMARY OF THE INVENTION

It is an object of this invention to provide methods of producing anchor-bonded composite structures, each of a base plate and a cladding plate anchor bonded into an integral plate structure, which are not accompanied by the problems encountered heretofore. More specifically, it is an object of the invention to provide methods of producing, at low cost, anchor-bonded structures which possess high resistance to shearing between the base plates and their cladding plates, and which retain their original performance without change over a long period of use.

According to this invention in one aspect thereof, there are provided methods of producing composite structures by anchor bonding into an integral plate structure a base plate of steel and a cladding plate of aluminum, and in which the two plates are joined in a locked state by anchors integral with the cladding plate and forcibly inserted into and plastically deformed into corresponding anchor cavities formed in the base plate, the anchors and/or the anchor cavities having overhanging or catching parts affording a positive locking or anchoring joint between the two plates. Alternatively, anchor cavities to be mutually confronting and aligned are formed with overhanging parts respectively in the base plate and the cladding plate and then filled with a rivet-like or hour-glass-shaped anchor pin. The anchor cavities are formed by any suitable process such as forging, rolling, or machining.

The nature, utility, and further features of this invention will be more clearly apparent from the following detailed description with respect to preferred embodiments of the invention when read in conjunction with the accompanying drawings, which are briefly described below, and in which sectional views are taken in planes perpendicular to the plane of the outer surface of the cladding plate or the base plate.

DETAILED DESCRIPTION OF THE INVENTION

The structures shown in the drawings illustrate examples of composite structures which are designed to serve as reaction plates for supporting and propelling by induction the chassis of a linear motor car. Each of these composite structures comprises, essentially a steel base plate 1 and an aluminum alloy cladding plate 2 joined tightly by anchor bonding to the base plate to form the unitary composite structure. More specifically the two plates are anchor bonded at their respective anchor parts as will now be described in detail with respect to several examples constituting preferred embodiments of the invention.

Figure 1:
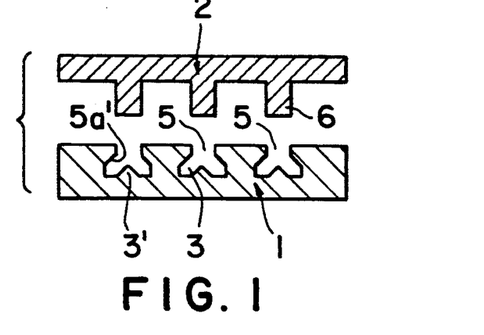
FIG. 1 is a sectional view showing one example of a base plate and a corresponding cladding plate according to this invention prior to their being anchor bonded.
Figure 2:
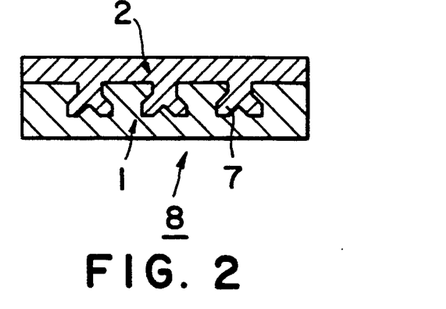
FIG. 2 is a sectional view of the same base plate and cladding plate in an anchor-bonded state as an integral structure.
Figure 3:
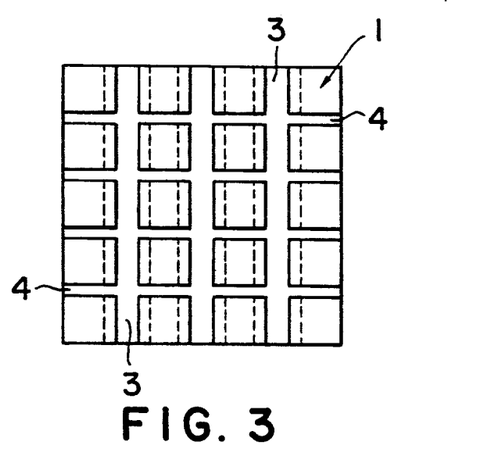
FIG. 3 is a plan view of the base plate.
Figure 4:
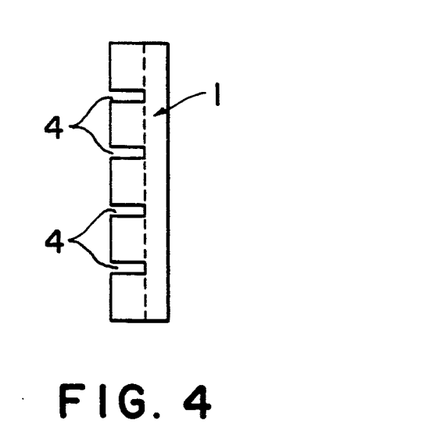
FIG. 4 is a side view of the base plate as viewed from the right in FIG. 3.
Figure 5:
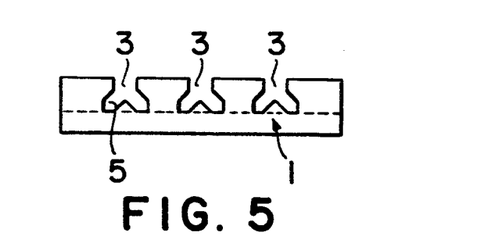
FIG. 5 is a side view of the base plate as viewed from below in FIG. 3.

As shown in FIGS. 1 through 7, the steel base plate 1 is a square plate, and the cladding plate 2 of aluminum is of the same shape in plan view. On one flat face of the base plate 1 when it is being prepared, a number of parallel and spaced-apart grooves 3 of specific width, spacing and cross-sectional shape are formed in a first direction (these grooves being referred to hereinafter as first grooves), as shown in FIGS. 1, 3, and 5. Also on the same face of the base plate 1 a number of parallel and spaced-apart transverse grooves 4 of specific narrow width and spacing are formed in a second direction perpendicular to the first direction (these narrow grooves being referred to hereinafter as second grooves). Each of the first grooves 3 has a split-bottom shape with a ridge-like projection 3', similar to the capital letter Y in inverted state, whereby an anchor cavity 5 with overhanging lips 5a' is formed along that first groove between each pair of adjacent second grooves.

In the preparation of the cladding plate 2, protruding ribs 6 of grid network form to become anchor parts are formed integrally on one (bottom) face of the cladding plate 2 in positions to be in alignment with corresponding anchor grooves 3 and 4

Figure 6:
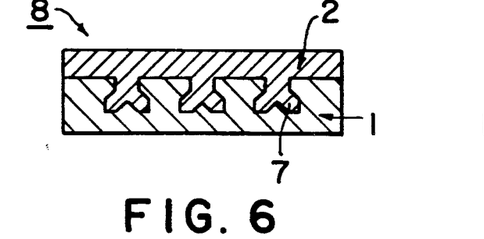
FIG. 6 is a sectional view of the anchor bonded structure as viewed in the same direction as in FIG. 5.
Figure 7:
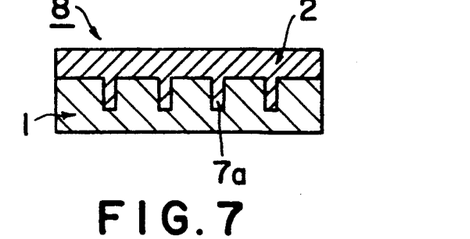
FIG. 7 is a sectional view of the same structure as viewed in the same direction as in FIG. 4.
Figure 8:
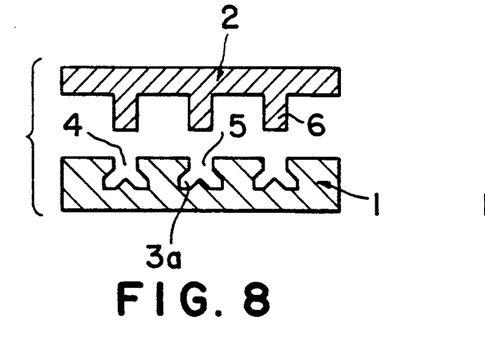
FIG. 8 is a sectional view indicating the process of anchor bonding of a cladding plate to a base plate.
Figure 9:
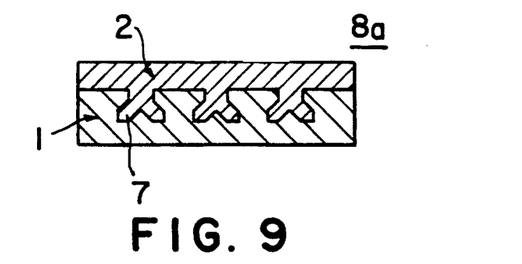
FIG. 9 is a sectional view showing the anchor-bonded unitary structure.

Then, in the process of assembling the two plates 1 and 2, they are mutually registered so that the protruding ribs 6 are aligned in coincidence with corresponding anchor grooves 3 and 4 and then pressed together. As a result, the protruding ribs 6 of the cladding plate 2 are forced into their respective anchor grooves 3 and 4 in the base plate 1 and, undergoing plastic deformation, bite into the grooves to become locked therein. Thus an integrally anchor-bonded composite structure 8 to serve as a reaction plate is obtained as shown in FIGS. 2, 6, and 7. The two plates 1 and 2 are thus joined at their joint interface by anchor bonds 7 and 7a which exhibit extremely high resistance to shearing forces in the aforementioned first and second directions and high bonding strength. Therefore, there is no possibility of slippage occurring between the base plate 1 and the cladding plate 2 in any direction during use.

This high strength is exhibited also with respect to vibrations and thermal action.

Figure 10:
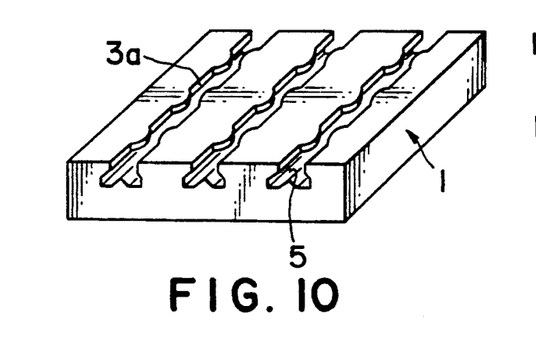
FIG. 10 is a perspective view showing another example of the base plate.
Figures 11, 13:
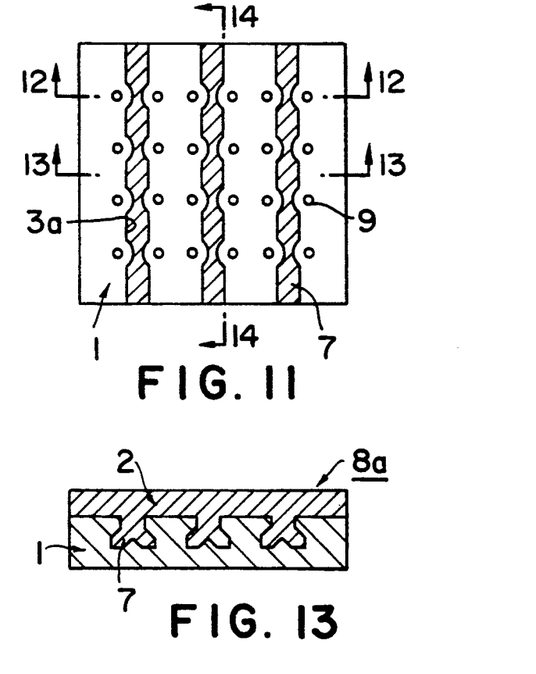
FIG. 11 is a plan view of an anchor-bonded structure with a base plate similar to that in FIG. 10, the view being partly in section taken along the interface between the cladding plate and the base plate.
FIG. 13 is a sectional view taken along the line 13—13 in FIG. 11.
Figure 12:
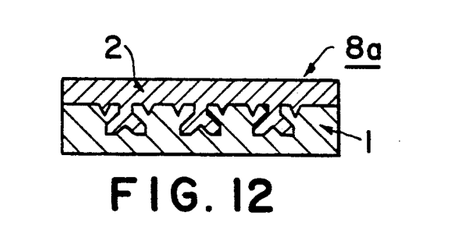
FIG. 12 is a sectional view taken along the line 12—12 in FIG. 11.
Figure 14:
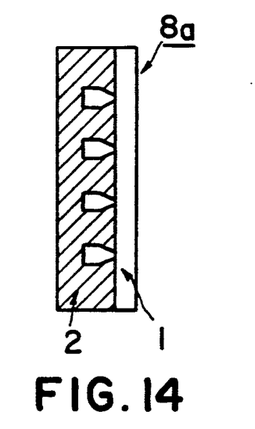
FIG. 14 is a sectional view taken along the line 14—14 in FIG. 11.
Figure 15:
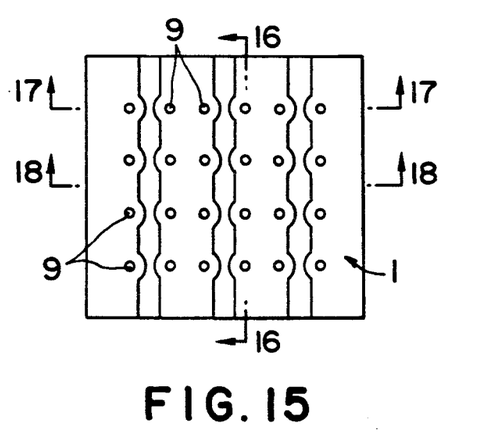
FIG. 15 is a plan view of the base plate prior to anchor bonding.
Figure 16:
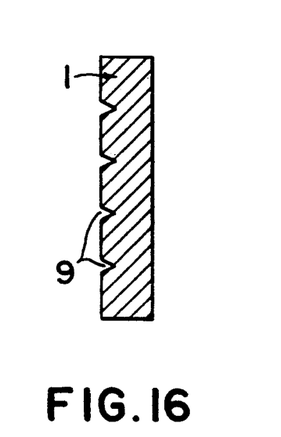
FIG. 16 is a sectional view taken along the line 16—16 in FIG. 15.
Figure 17:
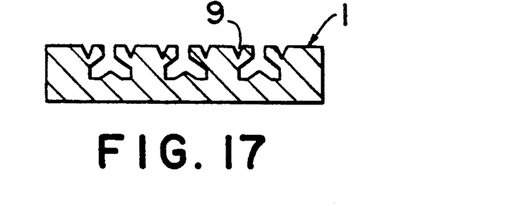
FIG. 17 is a sectional view taken along the line 17—17 in FIG. 15.
Figure 18:
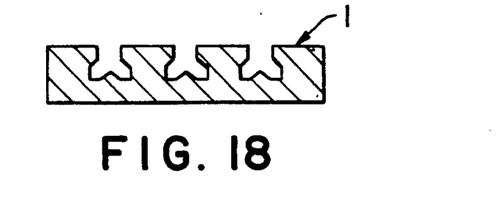
FIG. 18 is a sectional view taken along the line 18—18 in FIG. 15.

In another example as shown in FIGS. 8 through 18, instead of the first and second anchor grooves 3 and 4 of straight-line form as in the preceding example, only first anchor grooves 3a as shown in FIGS. 10 and 11 are used. Each of these grooves 3a is formed by plastic deformation to have flanking walls of curved wave-like shape. Furthermore, anchor depressions or holes 9, 9, of inwardly tapering shape are formed in the same face of the base plate 1 on opposite sides of each anchor groove 3a at specific spaced intervals therealong. A cladding plate 2 which is similar to that in the preceding example and has protruding ribs 6 to align with respective anchor grooves 3a is prepared and pressed under great pressure against the base plate 1. As a result, the cladding plate 2 is integrally joined to the base plate 1 by anchor bonds 7 to produce a unitary composite structure 8a as shown in FIGS. 12, 13, and 14. In this composite structure 8a, also, there is no possibility of slippage in the first and/or second directions between the cladding plate 2 and the base plate 1 due to causes such as vibration and thermal action. Thus a composite structure 8a of stable mechanically bonded state is obtained.

Figure 19:
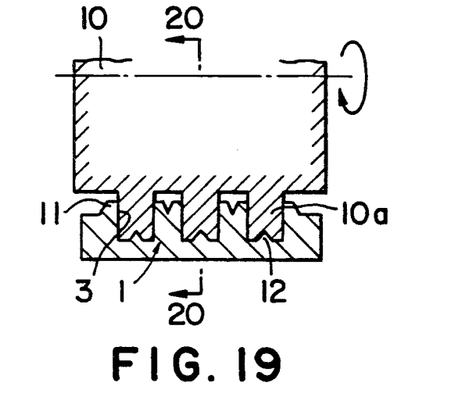
FIG. 19 is a sectional view indicating a rolling process for forming a base plate.
Figure 20:
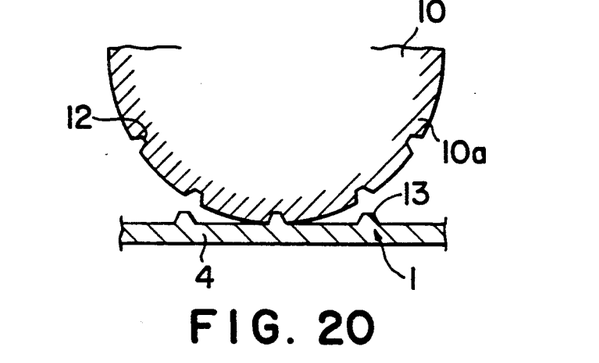
FIG. 20 is a sectional view taken along the line 20—20 in FIG. 19.
Figure 21:
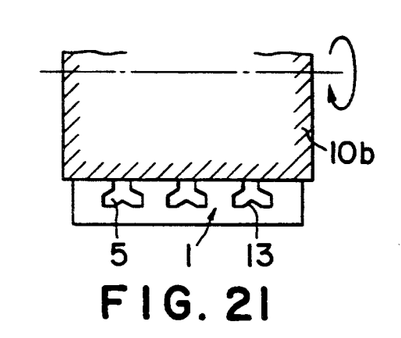
FIG. 21 is a sectional view indicating a rolling process for leveling and finishing the base plate.
Figures 22, 23:
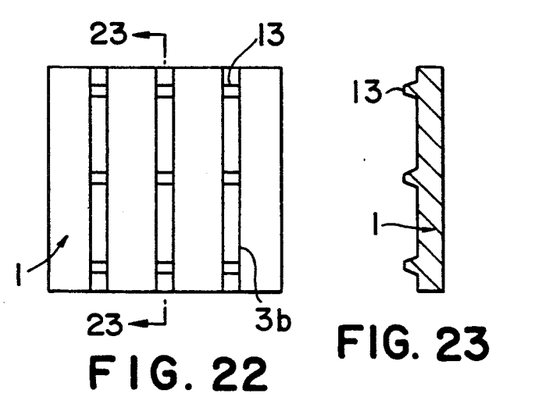
FIG. 22 is a plan view of a base plate.
FIG. 23 is a sectional view taken along the line 23—23 in FIG. 22.
Figure 24:
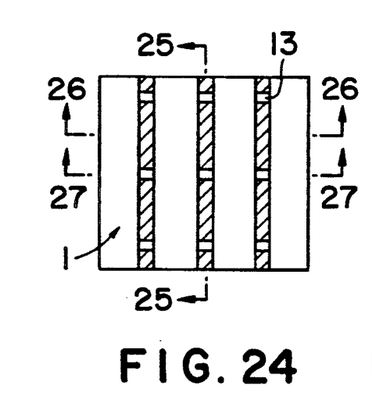
FIG. 24 is a plan view, partly in section, of the corresponding cladding plate.
Figure 25:
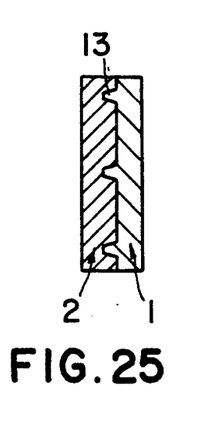
FIG. 25 is a sectional view taken along the line 25—25 in FIG. 24.
Figure 26:
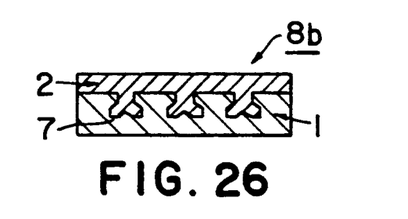
FIG. 26 is a sectional view taken along the line 26—26 in FIG. 24.
Figure 27:
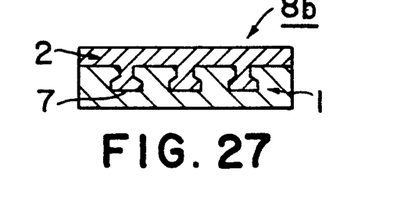
FIG. 27 is a sectional view taken along the line 27—27 in FIG. 24.

In another example as shown in FIGS. 19 through 27, first grooves 3 are formed in the base plate 1 by annular protruding parts 10a of a rolling roll 10. At the same time, projections 13 of truncated triangular shape in section are formed with a specific spacing pitch on the bottoms of the first grooves 3 by grooves 12 formed with a specific spacing in the circumferential direction on the protruding parts 10a of the roll 10. Then, as shown in FIG. 21, the surface of the base plate 1 is rolled by another rolling roll 10b thereby to flatten the upwardly rising parts 11 formed on the two edges at the upper part of each first groove 3. In this manner anchor cavities 5 having overhangs can be formed. Thus, as shown in FIGS. 22 and 23, projections 13 of the shape of a truncated triangle in section are formed with a specific spacing in the longitudinal direction of the anchor cavities 5.

Then, similarly as in the preceding examples, by pressing the cladding plate 2 against the base plate 1, the anchors 6 are forced into engagement into the anchor cavities 5 thereby to produce a mechanically integrated structure 8b of the two plates.

In the instant example, the anchor bond 7 produced by the forcible fitting of the anchors 6 of the cladding plate 2 into the anchor cavities 5 of the base plate 1 is further prevented from undergoing slippage in the longitudinal direction by the projections, 13 whereby its resistance to shear stress is further increased.

Figure 28:
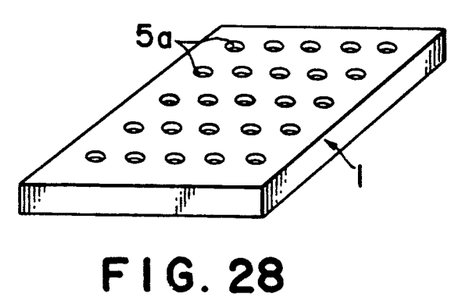
FIG. 28 is a perspective view of still another example of a base plate according to the invention.
Figure 29:
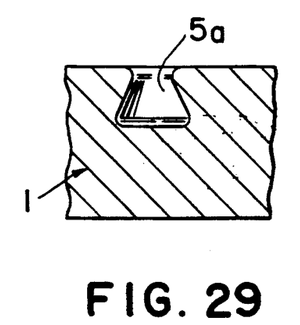
FIG. 29 is an enlarged fragmentary sectional view of the same base plate.
Figure 30:
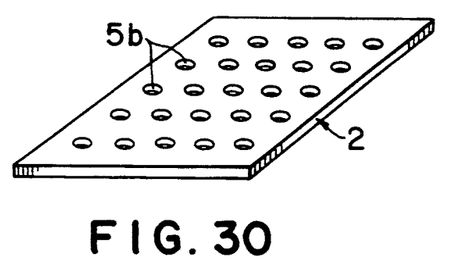
FIG. 30 is a perspective view of the corresponding cladding plate.
Figure 31:
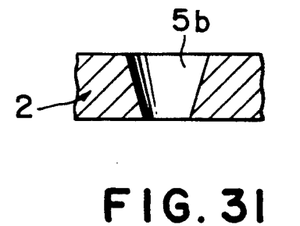
FIG. 31 is an enlarged fragmentary sectional view of the same cladding plate.
Figure 32:
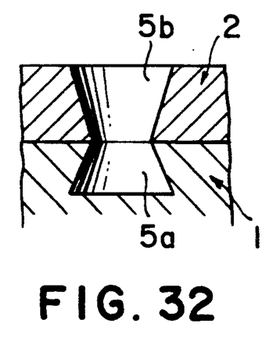
FIGS. 32, 33, and 34 are similar sectional views indicating the process of anchor bonding the base plate and cladding plate shown in FIGS. 28 and 30 by means of a rivet-like anchoring material.

In the forming of the anchor cavities 5 in the base plate 1 in each of the above described examples, a rolling roll as indicated in FIGS. 19, 20, and 21 is used. However, these anchor cavities are not limited to a pattern of linear rows but may be in a pattern of intermittent or spaced individual cavities. In one example of such anchor cavities as shown in FIGS. 28 through 34, tapered anchor cavities 5a and 5b having overhanging parts as shown in FIGS. 29 and 31 are formed respectively in the base plate 1 and the cladding plate 2 at coincidently aligned positions which are in a regular pattern as shown in FIGS. 28 and 30. Each anchor cavity 5a in the base plate 1 can thus be coaxially aligned with a corresponding anchor cavity or hole 5b in the cladding plate as shown in FIG. 32.

Figure 33:
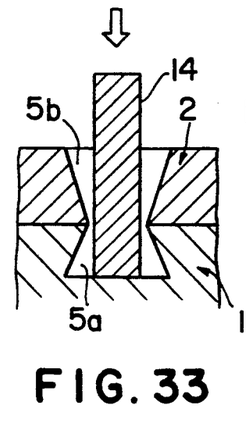
Figure 34:
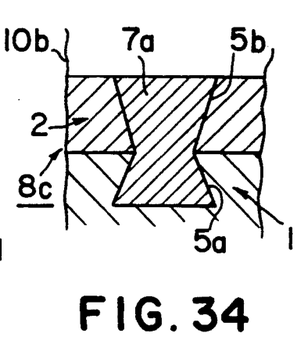

Then, as indicated in FIG. 33, an anchor pin 14 is inserted into the aligned anchor cavities 5a and 5b and is pressed by means of a rolling roll 10b or means such as a press, forcing the anchor pin 14 into the anchor cavities 5b and 5a. As a result, the anchor pins 14 are plastically deformed to fill the anchor cavities, whereby an anchor bond 7a is formed, each as shown in FIG. 34, and the cladding plate 2 and the base plate 1 are mechanically bonded to form a unitary structure 8c.

Figure 35:
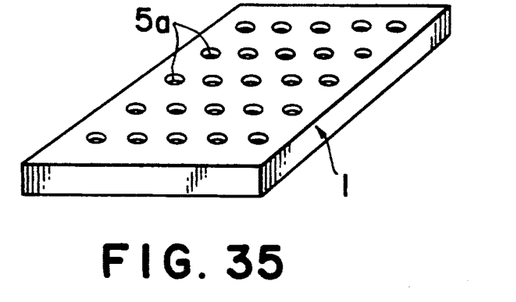
FIG. 35 is a perspective view of a base plate with spot or intermittent anchor cavities.
Figure 36:
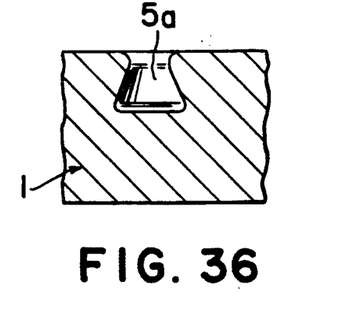
FIG. 36 is an enlarged fragmentary sectional view of the same base plate.
Figure 37:
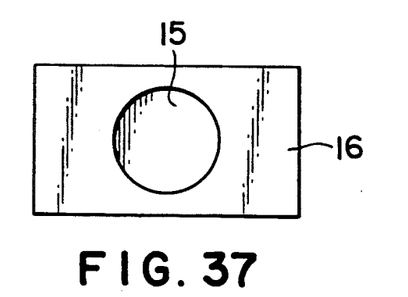
FIGS. 37, 38, and 39 are respectively a plan view and sectional views in orthogonal directions showing a forming plate placed on a base plate.
Figure 38:
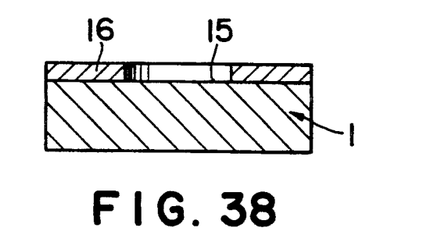
Figure 39:
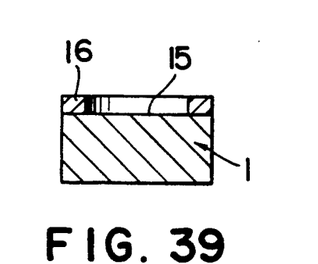
Figure 40:
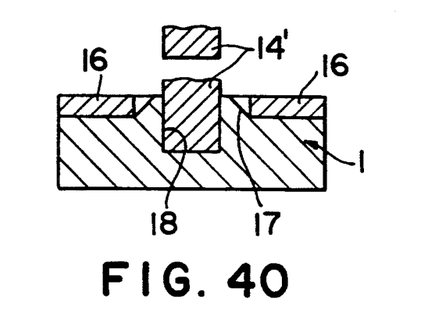
FIGS. 40 and 41 are sectional views indicating a process for forming an anchor cavity with the use of the forming plate and a leveling plate.
Figure 41:
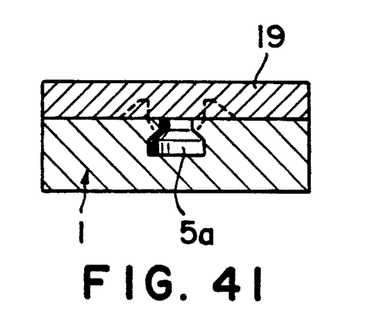
Figure 42:
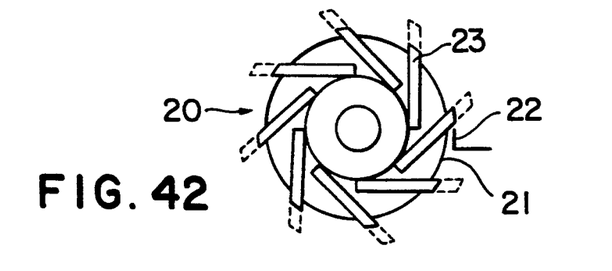
FIG. 42 is a plan view of a milling tool holder with extendable/retractable cutting tools for forming an anchor cavity in a base plate.

Another mode of producing an anchor bonded structure is illustrated in FIGS. 35 through 41. In this example, the base plate 1 is fabricated, as indicated in FIGS. 37, 38, and 39, by placing a forming plate 16 with a circular hole 15 formed therethrough at a position on the base plate 1 where an anchor cavity 5a is to be formed, placing a punch 14' of a diameter smaller than that of the circular hole 15 on the base plate 1 concentrically with the circular hole 15, and applying a punching force on the punch 14' thereby forcing of the base plate 1 to rise upwardly and thus form an upwardly raised mound 17, a punched hole 18 being formed at the same time in the base plate 1. Thereafter, as indicated in FIG. 41, a leveling plate 19 is placed over the region of the base plate 1 thus processed and pressed thereagainst. As a result, the upwardly raised mound 17 is forced to flow inwardly, and an anchor cavity 5a of an overhanging shape is formed as shown in FIG. 36. In this manner, a plurality of intermittent anchor cavities 5a spaced apart in a regular pattern are formed in the base plate 1 as shown in FIG. 35.

Figure 43:
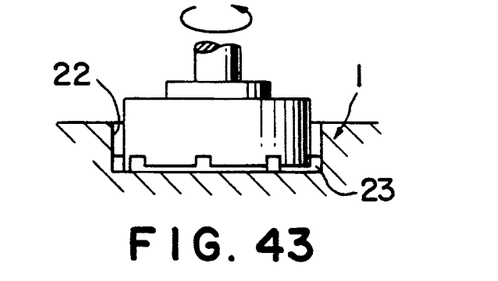
FIGS. 43 and 44 are sectional views indicating the process of forming the anchor cavity with the tool.
Figure 44:
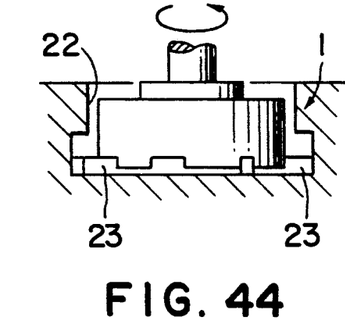
Figure 45:
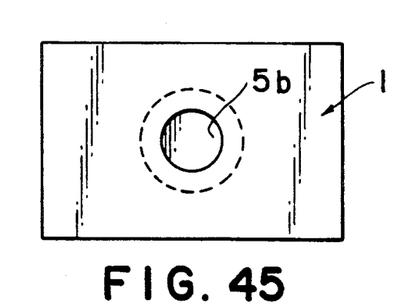
FIGS. 45, 46, and 47 are respectively a plan view and sectional views showing an anchor cavity formed by such process.
Figure 46:
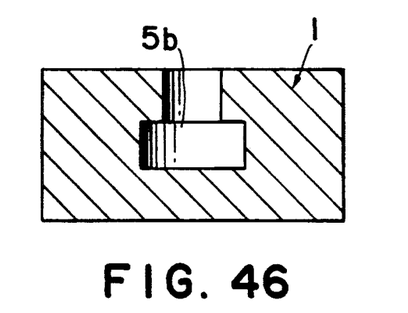
Figure 47:
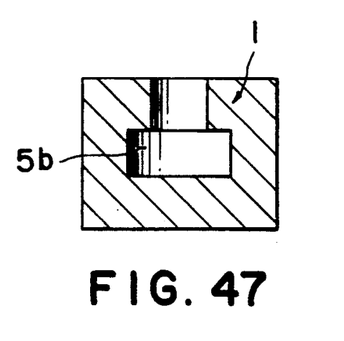

Still another mode of forming spot anchor cavities 5b will now be described with reference to FIGS. 42 through 47. A circular hole 22 is first formed in the base plate 1 by suitable means such as a milling machine. Then a rotary tool holder 20 comprising a rotor 21 and a plurality of cutting tools 23 retractably imbedded in the lower periphery of the rotor 21 is inserted coaxially into the hole 22 as shown in FIG. 43. The rotary tool holder 20 is then rotated as the cutting tools 23 are progressively extended outwardly as indicated in FIG. 44, thereby to mechanically form an anchor cavity 5b of overhanging shape as shown in FIGS. 45, 46, and 47.

Figure 48:
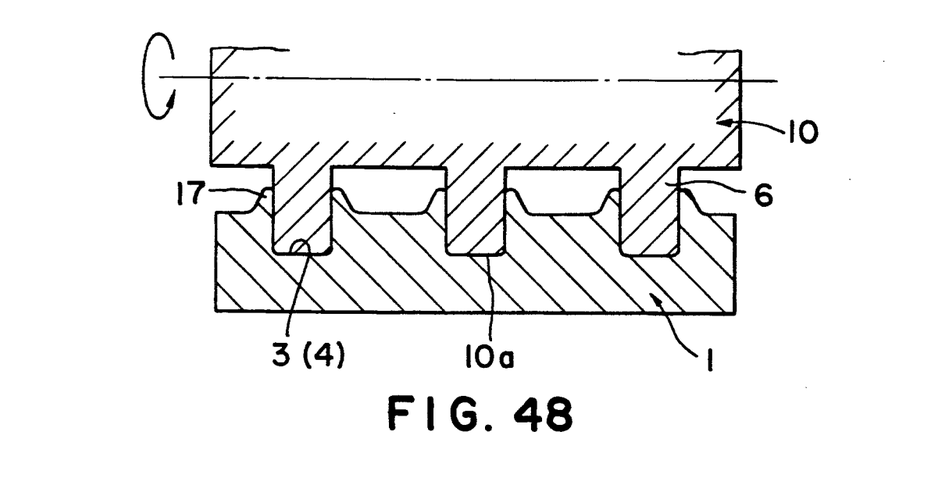
FIGS. 48, 49, and 50 are sectional views indicating a process for forming anchor cavities in the form of linear rows by means of rolls.

Irrespective of whether the anchor cavities are to be anchor cavities 5a of linear rows form or whether they are to be anchor cavities 5b of in non-linear row arrangement, they can be formed in overhanging shape by rolling to be of the following manner. By means of annular protruding parts 10a of a rolling roll as shown in FIGS. 19 and 20 referred to hereinbefore and as indicated in FIG. 48, a pressing force is imparted to the base plate 1 thereby to form first grooves 3 (or second grooves 4). At the same time, forced up parts 17 are formed on the upper surface of the base plate 1 on both sides of each protruding part 10a. Then, according to the conventional process, the forced up parts 17 are abruptly flattened in the succeeding stage by means of a plan or smooth roll for leveling thereby to form anchor cavities of overhanging shape. As a consequence, the overhanging shape has been irregular, or has collapsed.

Figure 49:
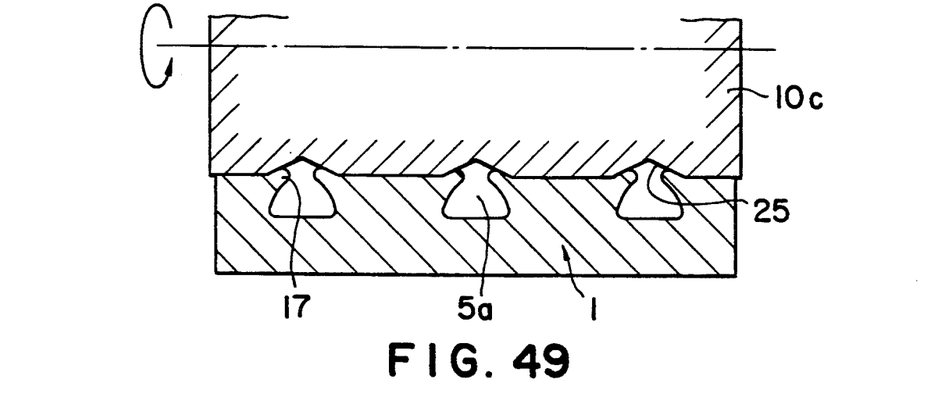
Figure 50:
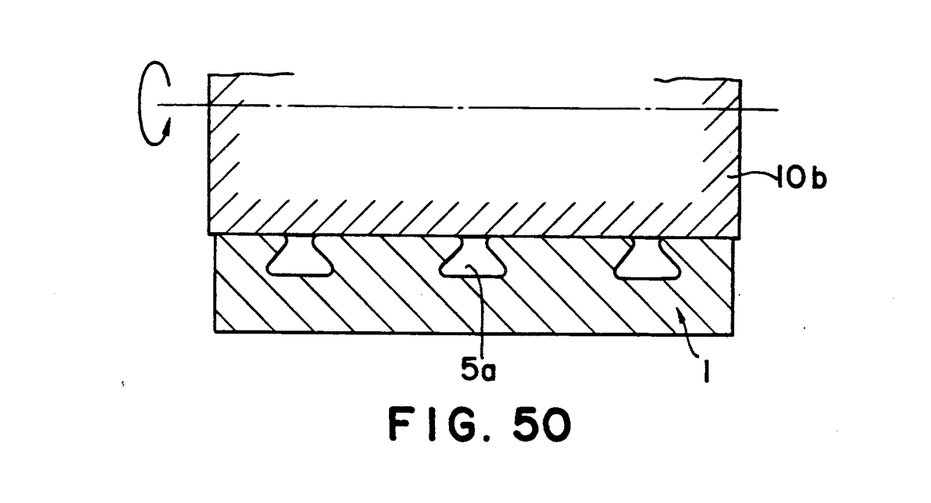

In contrast, according to this invention, the forced up parts 17 are rolled by means of a forming roll 10c as indicated in FIG. 49, whereby they are caused to flow and bend gently inwardly. Finally, as indicated in FIG. 50, these parts are leveled by a smooth roll 10b. As a result, all of the anchor cavities 5a are formed into an overhanging shape accurately and consistently exactly as designed.

The modes of practicing this invention are, of course, not limited to the above described examples thereof. For example, in the process of fitting and joining the anchors of the cladding plate with the anchor cavities of the base plate, a suitable industrial adhesive or a corrosion resistant material can be applied to either one or both of the parts to be engaged in contact. By such a measure, the mechanical joining strength of the two metals as a unitary structure can be even further increased, and galvanic corrosion can be prevented. Thus, various modes of practice of this invention are possible.

Furthermore, in addition to the application of this invention to reaction plates of linear motor cars and tank plate materials of liquid natural gas transport vessels, its application to various machinery parts and structural members is possible.

According to this invention, in a composite structure comprising basically an integrally bonded base plate of steel and a cladding plate of aluminum such as a reaction plate of a linear motor car or a tank material of an liquid natural gas transport vessel, an anchor-bond integral joining can be obtained mechanically by the fitting and engagement of anchors of a cladding plate in corresponding anchor cavities in a base plate. For this reason, by the fitting and engagement in two orthogonal directions of these anchor cavities and anchors, the resistance to shear stress in the longitudinal direction is remarkably increased, and the initial bonding strength is maintained unchanged with lapse of time, whereby the functional performance of the resulting structure is continually maintained.

Furthermore, the bonding function of the bonded structure is made uniform, and the performances of bonded structures of long length or large areas can be further improved.

In the production of these bonded structures, by using measures such as rolling with rolls, machine processing, or forging, the forming of the anchor cavities or the fitting of the anchors into the anchor cavities is facilitated. Therefore, production costs can be lowered, and precision can be greatly improved.

What is claimed is:

1. A method of producing an anchor-bonded composite plate structure, said method comprising the steps of:

forming in a surface of a base plate tapered anchor cavities, each having an overhanging tapered internal side surface, said anchor cavities being arranged in a predetermined pattern; said forming comprising, for each said tapered anchor cavity:

placing a forming plate having a circular hole therethrough onto said surface of said base plate;

placing a punch of a diameter smaller than that of said circular hole through said circular hole concentrically therewith such that said punch contacts said surface of said base plate;

applying a punching force with said punch, thereby forcing material of said base plate to rise from said surface to form an annular mound within said circular hole and around said punch and thereby form a punched hole inside said annular mound; and pressing a leveling plate over the region of said mound and said punched hole to cause the material of said mound to flow inside said punched hole, thereby forming a tapered anchor cavity;

forming a cladding plate tapered anchor holes each extending through said cladding plate and arranged in a pattern coincident with said predetermined pattern;

placing said cladding plate onto said surface of said base plate with said anchor holes aligned with respective anchor cavities and with each said anchor hole having a taper thereof tapering in a direction opposite to that of said tapered internal side surface of the respective said anchor cavity;

inserting anchor pins into respective pairs of the thus aligned anchor cavities and anchor holes; and applying a force to said anchor pins such that said anchor pins are plastically deformed to fill said anchor cavities and said anchor holes, thereby mechanically bonding said base plate and said cladding plate.

2. The method as claimed in claim 1, wherein said plastic deformation of said anchor pins is carried out by rolling said anchor pins.

3. The method as claimed in claim 1, wherein said plastic deformation of said anchor pins is carried out by pressing said anchor pins.

* * * * *